Sept. 19, 1967     H. E. D. SCOVIL     3,343,102
SPATIAL AND SPECTRAL FUNNELING PUMPING SYSTEM
FOR OPTICALLY PUMPED MASER
Filed Oct. 17, 1963     2 Sheets-Sheet 1

INVENTOR
H. E. D. SCOVIL
BY
Sylvan Sherman
ATTORNEY

United States Patent Office 3,343,102
Patented Sept. 19, 1967

3,343,102
SPATIAL AND SPECTRAL FUNNELING PUMPING SYSTEM FOR OPTICALLY PUMPED MASER
Henry E. D. Scovil, New Vernon, N.J., assignor to Bell Telephone Laboratories, Incorporated, New York, N.Y., a corporation of New York
Filed Oct. 17, 1963, Ser. No. 316,813
13 Claims. (Cl. 331—94)

This invention relates to pumping arrangements for optically pumped masers. The term "maser" as used herein is intended to include devices emitting at both microwave and optical wavelength.

The weakest link in the development of reliable and economical optically pumped masers is the lack of a suitable pumping source. Specifically, pumping sources presently available simply are not bright enough. Even the high pressure mercury arc lamps that are currently used have a brightness which is considered to be marginal. Efforts to drive these lamps harder, in an effort to increase their brightness, have reduced their useful lifetime to such an extent as to make this type of use highly uneconomical.

As is known, the function of a maser pumping source is to establish a population inversion in the maser material by pumping atoms from a lower energy state to a higher energy state. If the pumping source is properly tuned and if the intensity of the pumping source is sufficiently high, depopulation of the lower state occurs at a rate fast enough to overcome the thermal processes leading to equilibrium and a population inversion is established.

The relationship between the two energy levels $E_2$ and $E_1$ in the maser material which are in nonequilibrium and the frequency $f$ of the pumping source is given by Bohr's frequency condition as $$E_2 - E_1 = hf$$

where $h$ is Planck's constant.

The quantity $E_2 - E_1$ also defines the energy possessed by each photon of energy emitted by the pumping source at frequency $f$. Hence, the higher the photon density of the pumping field, the larger is the number of particles in a given volume of material that can be pumped to the higher energy level.

It is, accordingly, an object of this invention to increase the photon density in the pumping field used to establish a population inversion in a maser material.

It has been proposed to increase the photon density of the pumping field by using an optical maser as a pumping source (see, for example, "Microwave Maser Action in Ruby at 78° K by Laser Pumping," by A. Szabo, Proceedings of I.E.E.E., July 1963, page 1037, and "Optical Pumping of Masers Using Laser Output," by I. F. Ready and D. Chen, March 1962, Proceedings of I.E.E.E., pages 327-328). This approach, however, does not solve the problem but merely shifts it from the maser being pumped to the pumping laser since the latter also requires an adequate pumping source. Furthermore, since the pumping source used in a maser need not be coherent, the use of a laser for this purpose unduly complicates the pumping source and is unwarranted.

It is, therefore, a further object of this invention to provide a simple and inexpensive incoherent pumping source for maser devices.

In accordance with the invention, the phenomenon of fluorescence is utilized to increase the photon density of the radiant field used to establish a population inversion in a maser material. Flourescence is defined as the process of emission of electromagnetic radiation by a substance as a consequence of the absorption of energy from some other radiation at a different frequency. By virtue of its ability to absorb radiant energy at a high frequency and convert it to radiant energy at a lower frequency, a fluorescent material is inherently capable of increasing the photon density of the lower frequency field over that of the incident higher frequency field.

As utilized herein, the fluorescent material is illuminated by means of a readily available source of radiation of relatively low photon density. The fluorescent output from the material, which has a relatively high photon density, is used, in turn, as the pumping source for the maser.

The fluorescent material is selected so that its emission band includes within it frequency components that fall within the absorption band of the maser material. The illuminating source is selected to have frequency components which fall within the absorption band of the fluorescent material.

The effectiveness of such a pumping arrangement is enhanced by using a fluorescent material that has a wide absorption band and a narrow emission band. The result is a spectral funneling of energy over a wide band of frequencies from an illuminating source that has low photon density at any particular frequency to a narrow band of frequencies of high photon density.

The photon density in the output of the fluorescent material is further increased by spacial funneling or, more specifically, by exposing a large area of fluorescent material to the incident radiation and extracting the energy emitted over a reduced surface area.

In a first illustrative embodiment of the invention a maser material is located along a narrow edge of a broad, thin slab of fluorescent material. The slab is illuminated along its broad surface by a source of radiation which has frequency components which fall within the absorption band of the fluorescent material. The light emitted by the material is directed upon the maser material and used as the pumping energy for establishing the desired population inversion.

In a second embodiment of the invention the longitudinal axis of a rod of maser material is colinearly aligned with the longitudinal axis of a rod of fluorescent material. The fluorescent material is illuminated along its entire length. Light emitted from the end of the rod of fluorescent material is utilized to end-pump the maser material.

These and other objects and advantages, the nature of the present invention, and its various features, will appear more fully upon consideration of the various illustrative embodiments now to be described in detail in connection with the accompanying drawings, in which:

FIG. 1 shows a maser pumping system in accordance with the invention utilizing a slab of fluorescent material;

FIGS. 2 and 3, given for purposes of explanation, show the particle distribution in a fluorescent material in equilibrium and under the influence of an external source of radiation;

FIG. 4 given for purposes of explanation, shows the energy levels of a fluorescent material having a broad absorption band and a narrow emission band;

Figure 1:
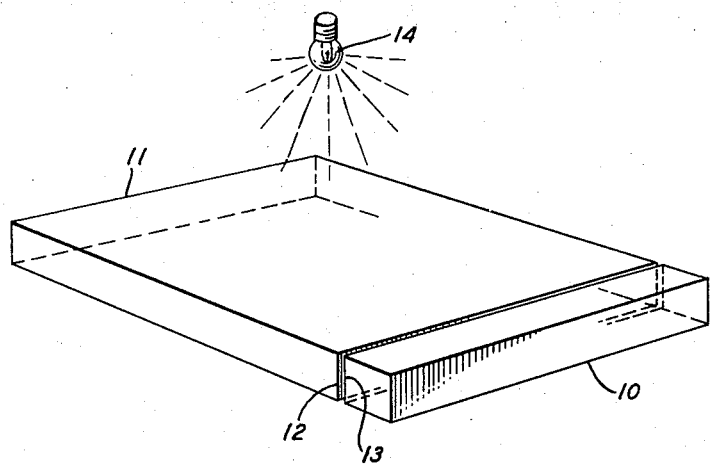

Referring now to FIG. 1, there is shown a maser pumping system in which the principles of the present invention are illustratively embodied.

The active material upon which the pumping field operates is shown as an elongated rod 10 which is typically a paramagnetic crystalline substance such as chromium-doped aluminum oxide (ruby) or, alternatively, the active material can be a mixture of gases contained within a hollow tube, as described in the copending application of A. Javan, Ser. No. 277,651, filed May 2, 1963. The term "rod" as used hereinafter shall be understood to include both the solid rod and the hollow tube of gas. Suitable reflecting means (not shown) are provided at each end of rod 10 in a manner well known in the art.

Pumping energy for producing a negative temperature in rod 10 is derived from a slab 11 of fluorescent material. In the embodiment of FIG. 1, one of the narrow edges 12 of slab 11 is contiguous to and extends coextensively with an edge 13 of rod 10.

A source of illumination 14 is located so as to illuminate at least one of the broad surfaces of slab 11.

Figure 2:
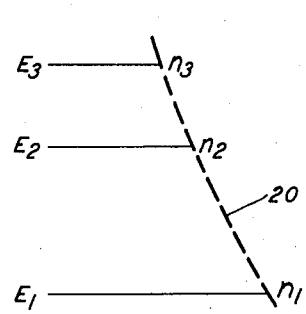
Figure 3:
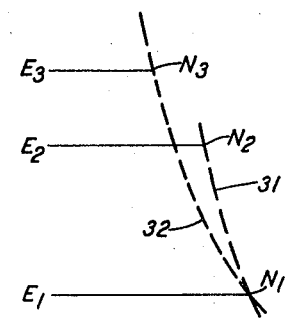

The operation of the pumping system in accordance with the invention can best be explained by reference to FIGS. 2 and 3. FIG. 2 is a diagram illustrating a three energy level system that is characteristic of a fluorescent material that can be used to practice the invention. It is understood, however, that these three levels can be part of a more complex system having more energy levels, as will be described hereinbelow. The energy levels illustrated are designated $E_1$, $E_2$ and $E_3$ in order of increasing energy. The average number of particles in each respective state is indicated by the length of the energy level line and is designated $n_1$, $n_2$, or $n_3$.

The ratio of particles in any two states is given by $$\frac{n_i}{n_j} = e^{(E_j - E_i)/kT_{ij}} \qquad (1)$$

where $k$ is Boltzmann's constant and $T_{ij}$ is the $i$—$j$ *system temperature*

Equation 1 is plotted as curve 20 in FIG. 2.

In the absence of any incident radiation and with the system in thermal equilibrium $$\frac{n_2}{n_3} = \frac{n_1}{n_2} = \frac{n_1}{n_3} \qquad (2)$$

and $$T_{23} = T_{12} = T_{13} \qquad (3)$$

Upon exposure to a source of radiation, however, the particle distribution shown in FIG. 2 is disturbed as some of the particles are raised from level $E_1$ to level $E_3$ and subsequently fall back to levels $E_2$ and $E_1$. As a result of these transitions, a new particle distribution is established wherein the average number of particles in each state is given by $N_1$, $N_2$ or $N_3$, respectively, as shown in FIG. 3. In general, there is an increase in the number of particles in the upper states and a corresponding decrease in the number of particles in the lowest state resulting in a system that is no longer in thermal equilibrium.

Writing the expressions for the ratio of particles in each of the various states gives $$\frac{N_1}{N_3} = e^{(E_3 - E_1)/kT_{13}} \qquad (4)$$

$$\frac{N_2}{N_3} = e^{(E_3 - E_2)/kT_{23}} \qquad (5)$$

$$\frac{N_1}{N_2} = e^{(E_2 - E_1)/kT_{12}} \qquad (6)$$

The ratio $N_1/N_3$ is a function of the temperature $T_{13}$ which, under optimum conditions, is approximately equal to the temperature of the source of radiation that has created the new distribution. In the embodiment of FIG. 1 this corresponds to the temperature of the source 14.

The ratio $N_1/N_2$, in turn, defines a different temperature $T_{12}$. From the particle distribution assumed in FIG. 3, it is seen that the slope of curve 31, which is a function of $T_{12}$, is greater than the slope of curve 32, which is a function of temperature $T_{13}$. It therefore follows from Equation 1 that the temperature $T_{12}$ is larger than the temperature $T_{13}$. Since the transition from state $E_2$ to state $E_1$ accounts for the emission of energy from the fluorescent material, it further follows that the energy emitted by slab 11, in FIG. 1, and incident upon the maser rod 10, appears to come from a source whose temperature is higher than that of source 14.

Since the photon density $\rho$ emitted by a source is related to the source temperature T by $$\rho = \frac{1}{e^{hf/kT} - 1} \qquad (7)$$

where $h$ is Planck's constant, it is seen that as the source temperature increases the density of the photons emitted by that source also increases. Thus, the density of photons emitted by the fluorescent material 11 is greater than the photon density emitted by source 14. (For a more detailed discussion see the article entitled "The Three-Level Solid-State Maser," by H. E. D. Scovil, published in the I.R.E. Transactions on Microwave Theory and Techniques," vol. MTT 6, pages 29–38, January 1958, and, from the book Progress in Cryogenics, published in London, England, by Heywood and Company Ltd. in 1960, see the chapter by E. O. Schulz-Du Bois entitled, "The Three Level Solid State Maser," pages 188 through 197.)

We now apply these results to the embodiment of FIG. 1, wherein a readily available source of radiant energy 14 (such as a mercury arc) having a given bandwidth, is used to illuminate slab 11 and to cause it to fluoresce. As explained hereinabove, the light emitted by the slab 11 and applied to the maser rod 10 appears to come from a source of higher temperature and, hence, has a higher photon density than the source 14. As such, it is a more effective pumping source than source 14 would be if applied directly to the maser rod 10.

In the above discussion, a three level energy system was considered. It was noted, however, that these three levels can be part of a more complex energy system having more than three levels. We will now consider how such a system can be utilized to further increase the photon density of the light emitted by the fluorescent material.

Figure 4:
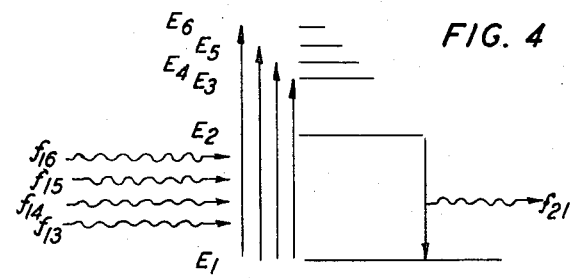

In FIG. 4 there is illustrated a system in which there are a plurality of high level states designated $E_3$, $E_4$, $E_5$ and $E_6$. To raise particles from state $E_1$ to these higher states requires the application of energy at frequencies $f_{13}$, $f_{14}$, $f_{15}$ and $f_{16}$ as indicated by the adjacent wavy lines. The transition down, however, occurs for all these particles between states $E_2$ and $E_1$, thereby emitting energy at only frequency $f_{21}$. In effect, energy is being funneled over a wide band of frequencies from a source that has a low photon density at any particular frequency to a narrow band of frequencies of higher photon density.

The process of spectral funneling described above can be exploited if the fluorescent material has an absorption band that is substantially broader than its emission band.

The photon density can be further increased by a process of spacial funneling by exposing a large area of fluorescent material to the incident radiation and extracting the energy emitted over a reduced surface area. This effect is illustrated in FIG. 1 wherein the incident radiation from source 14 is directed upon one of the broad surfaces of slab 11 while the radiation emitted by slab 11 is extracted through one of the thin edges 12.

The efficiency of the embodiment shown in FIG. 1 can be substantially improved by recognizing that the energy emitted by slab 11 is radiated in all directions. However, since only energy radiated toward the maser rod 10 produces any useful effect, it is advantageous to provide means for directing the emitted light toward edge 12 in order to prevent any energy directed towards the other edges from being lost. To this end, the other edges are silvered or otherwise made highly reflective to the emitted radiation. As a result, substantially all the energy incident upon these reflective surfaces is eventually directed toward edge 12 and applied to the maser rod 10.

Similarly, the broad surface of slab 11 opposite the source of illumination 14 is advantageously made reflective to both the incident radiation and the emitted radiation.

The upper broad surface of slab 11, on the other hand, is made frequency selective so as to pass the incident radiation from source 14 but to reflect the radiation emitted by the slab. Alternatively, the upper broad surface is left untreated. In this latter arrangement slab 11 is surrounded by a medium having a lower index of refraction than the slab and critical angle trapping of the emitted radiation incident upon the upper surface is relied upon to confine a major portion of this energy within the slab. Typically, the surrounding medium is air so that the condition for critical angle trapping is inherently present.

Figure 5:
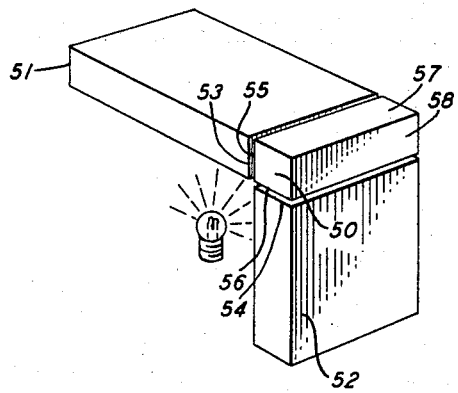
FIGS. 5 and 6 are illustrative of embodiments of the invention utilizing more than one slab of fluorescent material.

In FIG. 5 there is shown a pumping arrangement using two slabs 51 and 52 of fluorescent material. The slabs are oriented so that their edges 53 and 54 are in contact with the adjacent edges 55 and 56, respectively, of the maser material 50. As explained above, the remaining edges of slabs 51 and 52 are advantageously silvered for greater efficiency. In addition, the opposite edges 57 and 58 of rod 50 are also silvered, or otherwise made highly reflective at the pumping frequency. This latter expedient is advantageously utilized if the dimension of rod 50 is such that the pumping energy is not completely absorbed in the rod after one traversal.

Figure 6:
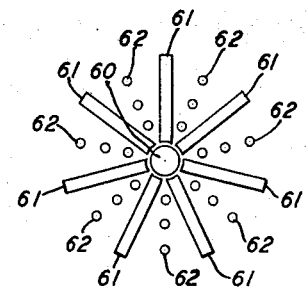

For high power masers using large maser rods, additional slabs of fluorescent material can be used as illustrated in FIG. 6. In this embodiment, a cylindrical maser rod is surrounded by a plurality (seven are shown) of fluorescent slabs 61. The slabs are arranged radially about the rod with one narrow edge of each abutting upon the maser material. A bank of lamps 62 is placed between pairs of slabs for illumination.

Various other arrangements can be devised. For example, in FIG. 7 an arrangement for end pumping a maser is illustrated. In this arrangement a cylindrical rod 70 of fluorescent material is used. The rod is illuminated from a source 71. For improved efficiency, the rod 70 and source 71 are located along the foci of an elliptical reflector 72.

The maser material 73 is located at one end of rod 70 with its longitudinal axis colinearly aligned with the longitudinal axis of rod 70. A dielectric multilayer reflector 74, designed to reflect wave energy at the frequency of the maser output but to pass wave energy at the frequency of the pumping wave, is disposed between the maser material and the fluorescent rod.

Figure 7:
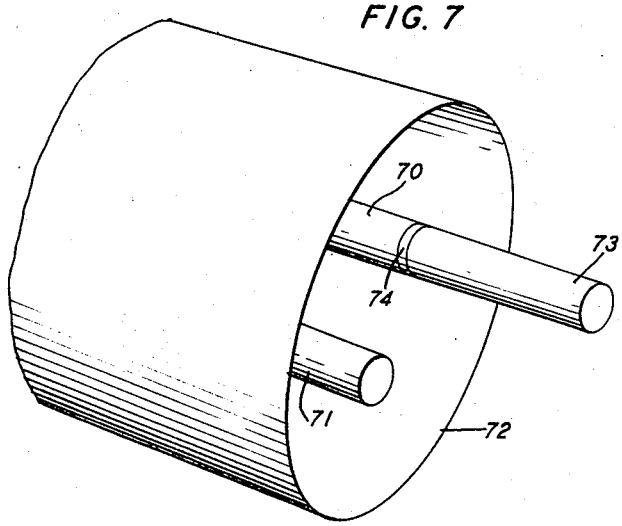
FIGS. 7 and 8 are illustrative of additional embodiments of the invention utilizing a colinear arrangement of maser material and fluorescent material.

The embodiment of FIG. 7 can be adapted to permit coupling of the pumping energy from the end of fluorescent rod 70 to a maser rod of smaller diameter by the addition of a focusing element between the two rods. This can take the form of a light collecting element of the type described in the copending application of W. S. Boyle and D. E. Nelson, Serial No. 134,776, filed August 29, 1961. This element, which typically takes the form of the frustrum of a cone, is placed between rods 70 and 73 with its larger end adjacent to rod 70 and its smaller end adjacent to rod 73.

Figure 8:
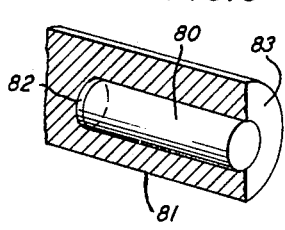

FIG. 8 is a modification of the arrangement shown in FIG. 7, in which the maser material 80 is embedded within the fluorescent material 81. As before a dielectric multilayer reflector 82 is disposed at one end of the maser material to reflect the maser output. In this embodiment the end 82 of the fluorescent rod is advantageously silvered or otherwise made reflective at the pumping frequency.

Figure 9:
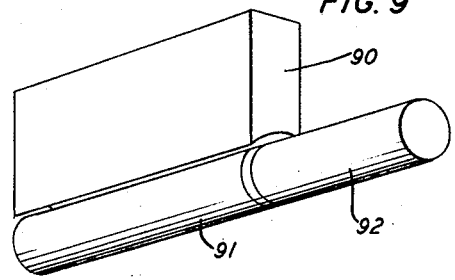
FIG. 9 is a further embodiment of the invention utilizing two cascaded fluorescent materials in the pumping system.

The increase in photon density produced in accordance with the invention can be enhanced by cascading fluorescent materials as illustrated in FIG. 9. In such an arrangement a first fluorescent material, which emits within the absorption band of a second fluorescent material, is used to illuminate the second fluorescent material. The output from the second fluorescent material, which has energy components that fall within the absorption band of the maser material, is used, in turn, to pump the maser material.

The particular embodiment illustrated in FIG. 9 utilizes a combination of the embodiments of FIG. 1 and FIG. 7. In the embodiment of FIG. 9, the output along one of the narrow edges of a slab 90 of a first fluorescent material is used to illuminate the side of a rod 91 of a second fluorescent material. The output, taken at an end of rod 91 is, in turn, used to end-pump a rod 92 of maser material.

Essentially any fluorescent material whether solid, liquid or gas can be used to practice the invention. As a practical matter, however, only those materials that fluoresce at a usable frequency are of any interest.

Illustrative of such a useful fluorescent material is the so-called "canary" glass manufactured by the Corning Glass Company. This material, which contains the bivalent radical uranyl ($UO_2$), is particularly useful in that the light emitted by the uranyl radical falls within the absorption band of two commonly used maser materials, ruby and neodymium.

As an example of the type of improvement that has been obtained using a pumping system in accordance with the invention, the photon density was measured at the end of a 0.35 inch diameter rod of canary glass, energized by a one kilowatt lamp, and found to be $5.6 \times 10^{17}$ photons per second-cm.$^2$-steradian. Over the same frequency band as that emitted by the canary glass, the output from the one kilowatt lamp alone was measured to be only $1.1 \times 10^{17}$ photons per second-cm.$^2$-steradians. This improvement of over five to one was realized using a material having a quantum efficiency of only 22 percent. Substantially greater improvements will be realized as improved materials are developed or discovered.

Further examples of materials that can be used to practice the invention are given in Table I which lists fluorescent organic materials and the maser materials that they can pump.

TABLE I

| Fluorescent Material | Masers Pumped |
| --- | --- |
| Fluorescein | Ruby; $U^{3+}$ in $CaF_2$; $Tm^{2+}$ in $CaF_2$ |
| Uranin | Ruby; $U^{3+}$ in $CaF_2$; $Tm^{2+}$ in $CaF_2$ |
| Eosin | $Sm^{2+}$ in $CaF_2$; $Tm^{2+}$ in $CaF_2$; $Sm^{2+}$ in $SrF_2$ |
| Rhodamine | $Nd^{3+}$ in $CaF_2$; $Sm^{2+}$ in $SrF_2$; $Tm^{2+}$ in $CaF_2$ |
| Acridine orange RS | Ruby; $U^{3+}$ in $CaF_2$; $Tm^{2+}$ in $CaF_2$; $Dy^{2+}$ in $CaF_2$ |
| Acronol yellow TS | $Dy^{2+}$ in $CaF_2$; $Tm^{2+}$ in $CaF_2$; $U^{3+}$ in $CaF_2$ |
| Chlorazol-corinth GWS | $Sm^{2+}$ in $CaF_2$; $Dy^{2+}$ in $CaF_2$ |
| Chlorazol blue GS | $U^{3+}$ in $CaF_2$; $Dy^{2+}$ in $CaF_2$ |
| Acridine picrate | Ruby; $U^{3+}$ in $CaF_2$; $Dy^{2+}$ in $CaF_2$; $Tm^{2+}$ in $CaF_2$ |
| Acridone | $U^{3+}$ in $CaF_2$; $Dy^{2+}$ in $CaF_2$; $Tm^{2+}$ in $CaF_2$ |
| Acridine | Ruby; $U^{3+}$ in $CaF_2$; $Dy^{2+}$ in $CaF_2$; $Tm^{2+}$ in $CaF_2$ |
| Quinine bisulfate | $U^{3+}$ in $CaF_2$; $Dy^{2+}$ in $CaF_2$ |
| Oxyquinoline sulfate | $Dy^{2+}$ in $CaF_2$ |

These materials are of great interest since they fluoresce strongly, having measured quantum efficiencies between 70 to 100 percent.

In all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. An optically pumped maser comprising:
a thin slab of fluorescent material having a pair of broad surfaces and a plurality of narrow edges and characterized by an absorption band and an emission band;

a rod of maser material disposed contiguous to one of said edges;

reflective means disposed along the other of said edges;

said rod being characterized by an absorption band which includes frequency components within the emission band of said fluorescent material;

and means for illuminating at least one of said broad surfaces comprising a source of radiation having frequency components within the absorption band of said fluorescent material.

2. The maser according to claim 1 including means for directing the radiant energy emitted by said fluorescent material upon said maser rod.

3. An optically pumped maser comprising:

a rod of maser material capable of absorbing radiant energy over a given band of frequencies;

a multiplicity of slabs of fluorescent material, each having a pair of broad surfaces and a plurality of narrow edges and each characterized by an absorption band and an emission band;

said emission band including frequency components which fall within the absorption band of said maser material;

said slabs arranged radially about said maser rod with said rod contiguous to an edge of each of said slabs;

and means for inducing fluorescence in said slabs.

4. The maser according to claim 3 wherein said maser material is a paramagnetic crystalline substance.

5. The maser according to claim 3 wherein the maser material is a mixture of gases contained within a hollow tube.

6. An optically pumped maser comprising:

a maser material;

means for pumping said maser material comprising a first fluorescent material having large and small surface areas and being capable of emitting radiant enery having frequency components within the absorption band of said maser material;

said maser material being exposed to radiant energy emitted from the small surface of said fluorescent material;

means exposed to the large surface of said fluorescent material for causing said first material to fluoresce comprising a second fluorescent material;

and means for causing said second fluorescent material to fluoresce.

7. The maser according to claim 6 wherein;

said maser material and said first fluorescent material are colinearly oriented rods and wherein;

said second fluorescent material is a slab having one edge thereof contiguous to said first fluorescent material.

8. The maser according to claim 6 wherein;

said maser material is embedded within a rod of said first fluorescent material and wherein;

said second fluorescent material is a slab having one edge thereof contiguous to said first fluorescent material.

9. Means for producing a population inversion in a substance comprising:

a fluorescent material having large and small surface areas;

said substance being contiguous to one of said small surface areas;

reflective means disposed along the other of said small surface areas;

and radiant means for causing said material to fluoresce exposed to one of said large surfaces.

10. An optically pumped maser comprising:

an elongated rod of fluorescent material having a side surface that is larger than its end surfaces and characterized by an emission band;

a rod of maser material characterized by an absorption band which includes frequency components within the emission band of said fluorescent material;

said rods being colinearly aligned end-to-end along a common longitudinal axis;

means for inducing fluorescence in said rod of fluorescent material exposed to said larger side surface;

and means disposed about said rod of fluorescent material for directing said fluorescence toward said rod of maser material.

11. The maser according to claim 10 wherein an end of one of said rods is contiguous to an end of the other of said rods.

12. The maser according to claim 10 wherein;

said maser rod is embedded within said rod of fluorescent material.

13. The maser according to claim 10 wherein;

said rods are longitudinally displaced from each other and including means for coupling the radiation emitted from an end of said fluorescent rod into an end of said maser rod.

References Cited

FOREIGN PATENTS 1,258,072  2/1961  France.

ROY LAKE, *Primary Examiner.*

DARWIN R. HOSTETTER, *Examiner.*